US007832571B2

(12) United States Patent
Felsenthal

(10) Patent No.: US 7,832,571 B2
(45) Date of Patent: Nov. 16, 2010

(54) SHELVING SYSTEM

(75) Inventor: Sandy Felsenthal, Earle, AR (US)

(73) Assignee: Whitmor Mfg. Co., Inc., South Haven, MS (US)

( * ) Notice: Subject to any disclaimer, the term of this patent is extended or adjusted under 35 U.S.C. 154(b) by 451 days.

(21) Appl. No.: 12/011,088

(22) Filed: Jan. 24, 2008

(65) Prior Publication Data

US 2008/0203042 A1 Aug. 28, 2008

Related U.S. Application Data

(60) Provisional application No. 60/886,524, filed on Jan. 25, 2007.

(51) Int. Cl.
*A47F 5/00* (2006.01)
(52) U.S. Cl. .................................... 211/134
(58) Field of Classification Search ............... 211/134, 211/187, 190, 207, 186, 175, 192; 108/147.11, 108/147.12, 110
See application file for complete search history.

(56) References Cited

U.S. PATENT DOCUMENTS

| 4,079,678 | A | * | 3/1978 | Champagne ............... 108/110 |
| 4,711,183 | A | * | 12/1987 | Handler et al. ............. 108/107 |
| D330,819 | S | | 11/1992 | Dickinson |
| 5,478,145 | A | * | 12/1995 | Kamachi .................. 312/263 |
| 5,632,389 | A | * | 5/1997 | Rosenband ................ 211/187 |
| 5,709,158 | A | | 1/1998 | Wareheim |
| 5,819,958 | A | | 10/1998 | Dement |
| 6,079,339 | A | | 6/2000 | Houk, Jr. et al. |
| 6,164,466 | A | * | 12/2000 | Baradat ...................... 211/186 |
| 6,253,933 | B1 | * | 7/2001 | Yang .......................... 211/187 |
| 6,688,478 | B2 | * | 2/2004 | Miller et al. ............... 211/59.2 |
| 6,752,278 | B2 | | 6/2004 | Craft et al. |
| 6,766,730 | B2 | * | 7/2004 | Wrenn ........................ 99/345 |
| 6,971,528 | B2 | * | 12/2005 | Chen ......................... 211/182 |
| 7,028,620 | B1 | | 4/2006 | Lyndon |
| 7,040,494 | B2 | | 5/2006 | Harper |
| 7,059,484 | B1 | * | 6/2006 | Goldberg .................... 211/187 |
| 7,191,908 | B2 | * | 3/2007 | De Rijk ...................... 211/191 |
| 7,249,679 | B2 | * | 7/2007 | Klein .......................... 211/37 |
| 7,478,971 | B2 | * | 1/2009 | Li .............................. 403/398 |
| 7,490,847 | B2 | * | 2/2009 | Dahl .......................... 280/638 |
| 2002/0030027 | A1 | * | 3/2002 | Welsch .................... 211/90.02 |
| 2004/0040922 | A1 | * | 3/2004 | Ko .............................. 211/153 |
| 2004/0245200 | A1 | * | 12/2004 | Jersey et al. ................ 211/189 |
| 2005/0092706 | A1 | * | 5/2005 | Chang ......................... 211/187 |
| 2006/0032829 | A1 | * | 2/2006 | Hutzler ....................... 211/187 |
| 2006/0076304 | A1 | * | 4/2006 | Kainuma et al. ......... 211/90.01 |
| 2007/0045209 | A1 | * | 3/2007 | Richardson et al. ......... 211/187 |
| 2007/0125738 | A1 | * | 6/2007 | Sevack ....................... 211/187 |
| 2008/0023427 | A1 | * | 1/2008 | Mangano .................... 211/187 |
| 2008/0142463 | A1 | * | 6/2008 | Johnson ..................... 211/187 |

* cited by examiner

*Primary Examiner*—Jennifer E. Novosad
(74) *Attorney, Agent, or Firm*—H. Frederick Rusche; Husch Blackwell LLP

(57) ABSTRACT

A shelving system includes first and second side frames, each of said side frames having at least one upwardly extending prong; a shelf frame having at least two connector sections, wherein each of said connector sections is in communication with one of said side frames; and wherein each connector section defines a vertical hole therein to receive one of said upwardly extending prongs.

6 Claims, 10 Drawing Sheets

SHELVING SYSTEM

TECHNICAL FIELD OF THE INVENTION

This invention relates generally to the field of storage and, more particularly, to an improved shelving system.

DESCRIPTION OF THE RELATED ART

Various types of shelving systems are known in the art. However, these shelves are typically difficult to assemble, and their assembly often requires various types of tools such as screwdrivers or wrenches. Furthermore, mechanisms, such as screws and nuts, used to attach the various components of these shelves often cause discontinuities on the outer surface of the shelves, which can be aesthetically displeasing and can have mechanical disadvantages.

Therefore, it would be advantageous to provide a shelving system that is simple to assemble without the use of tools and provides a fluent outer surface.

SUMMARY OF THE INVENTION

One aspect of the invention is to provide a shelving system that is capable of simple assembly that does not require the use of tools. Another aspect of the invention pertains to the use of a mechanism for attaching the various pieces of the system without causing interruptions in the aesthetic appearance of the outer surface of the shelves.

In one embodiment of the present invention, a shelving system is provided that includes first and second side frames, each of said side frames having at least one upwardly extending prong; a shelf frame having at least two connector sections, wherein each of said connector sections is in communication with one of said side frames; and wherein each connector section defines a vertical hole therein to receive one of said upwardly extending prongs.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the depicted embodiments of the present invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the number of shelves or drawers depicted in the figures. In other instances, well-known methods, procedures, and components have not been described in detail so as not to obscure the present invention.

Figure 1:
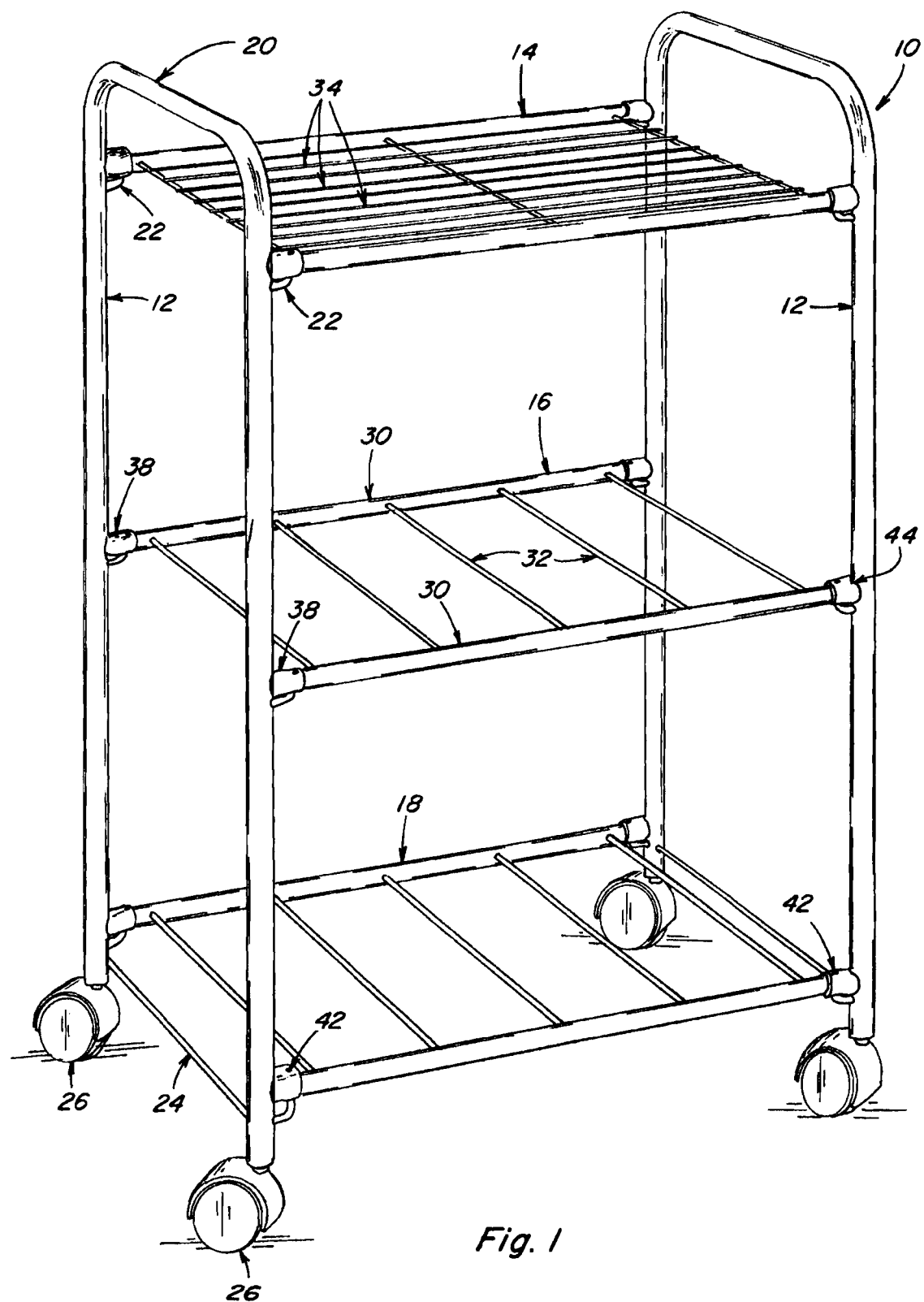
FIG. 1 is a perspective view of a shelving system without any drawers attached according to an embodiment of the present invention.
Figure 2:
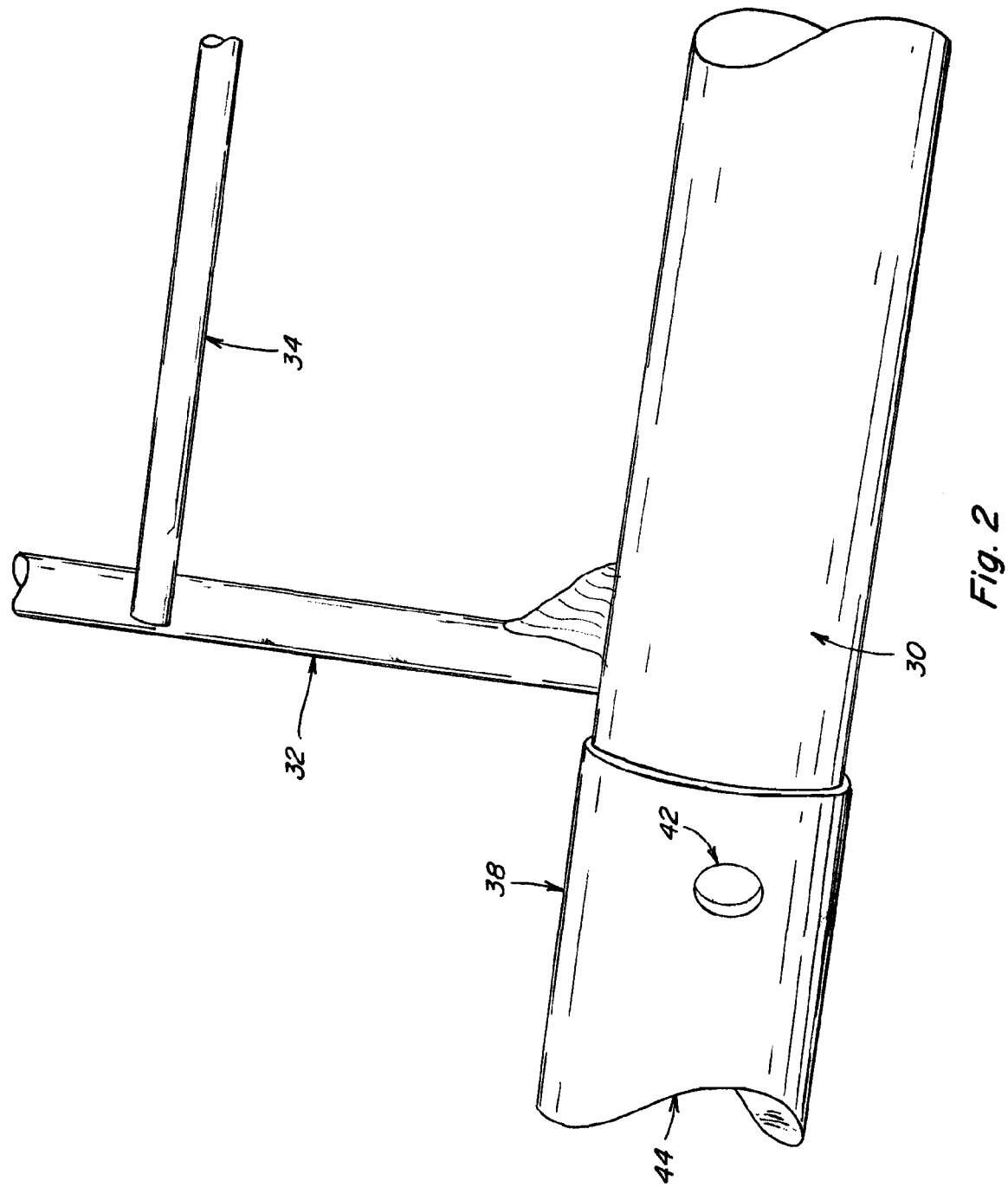
FIG. 2 is a perspective view of a plastic connector piece.
Figure 3:
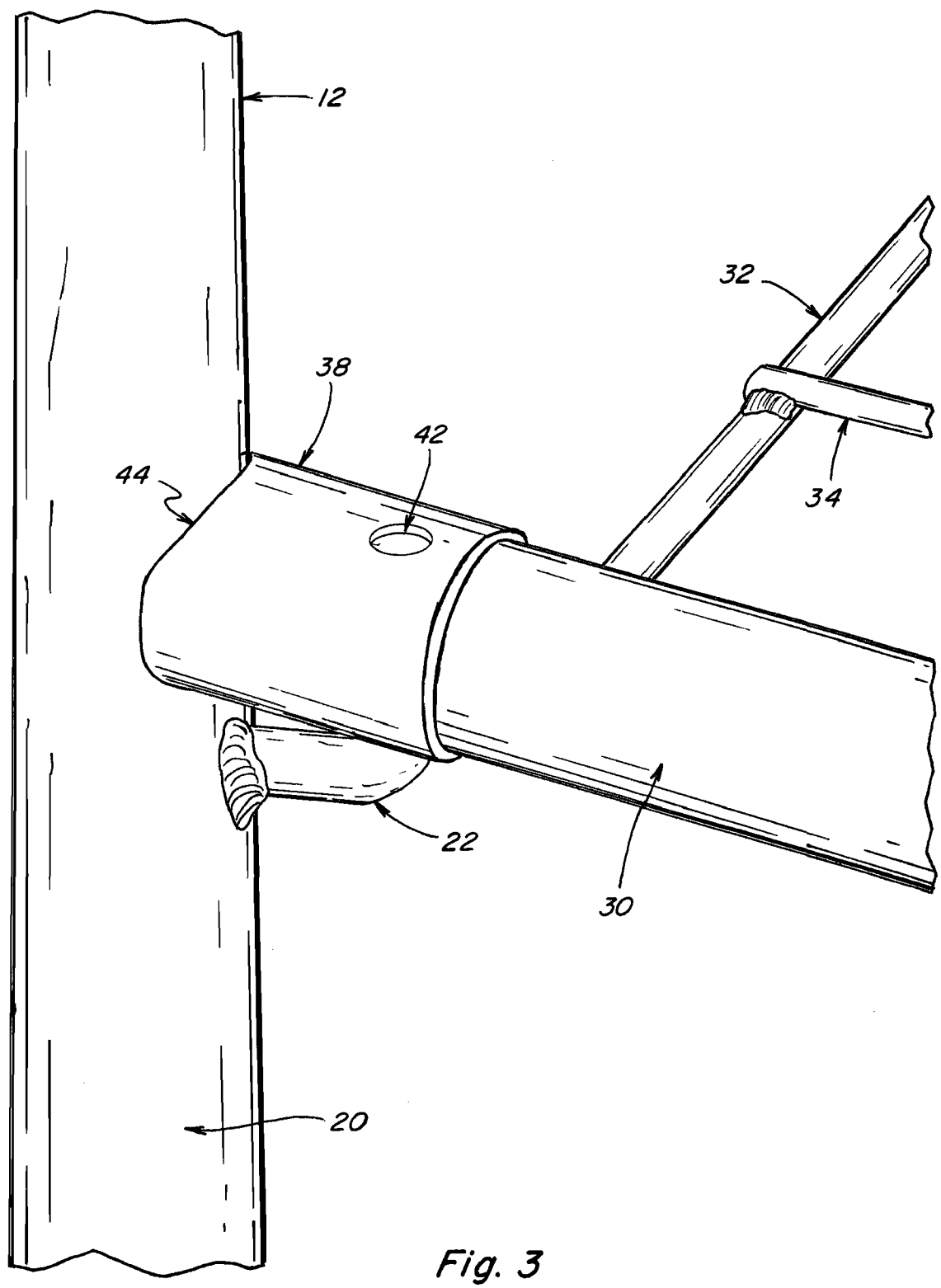
FIG. 3 is a perspective view of a plastic connector piece in an attached state.
Figure 4:
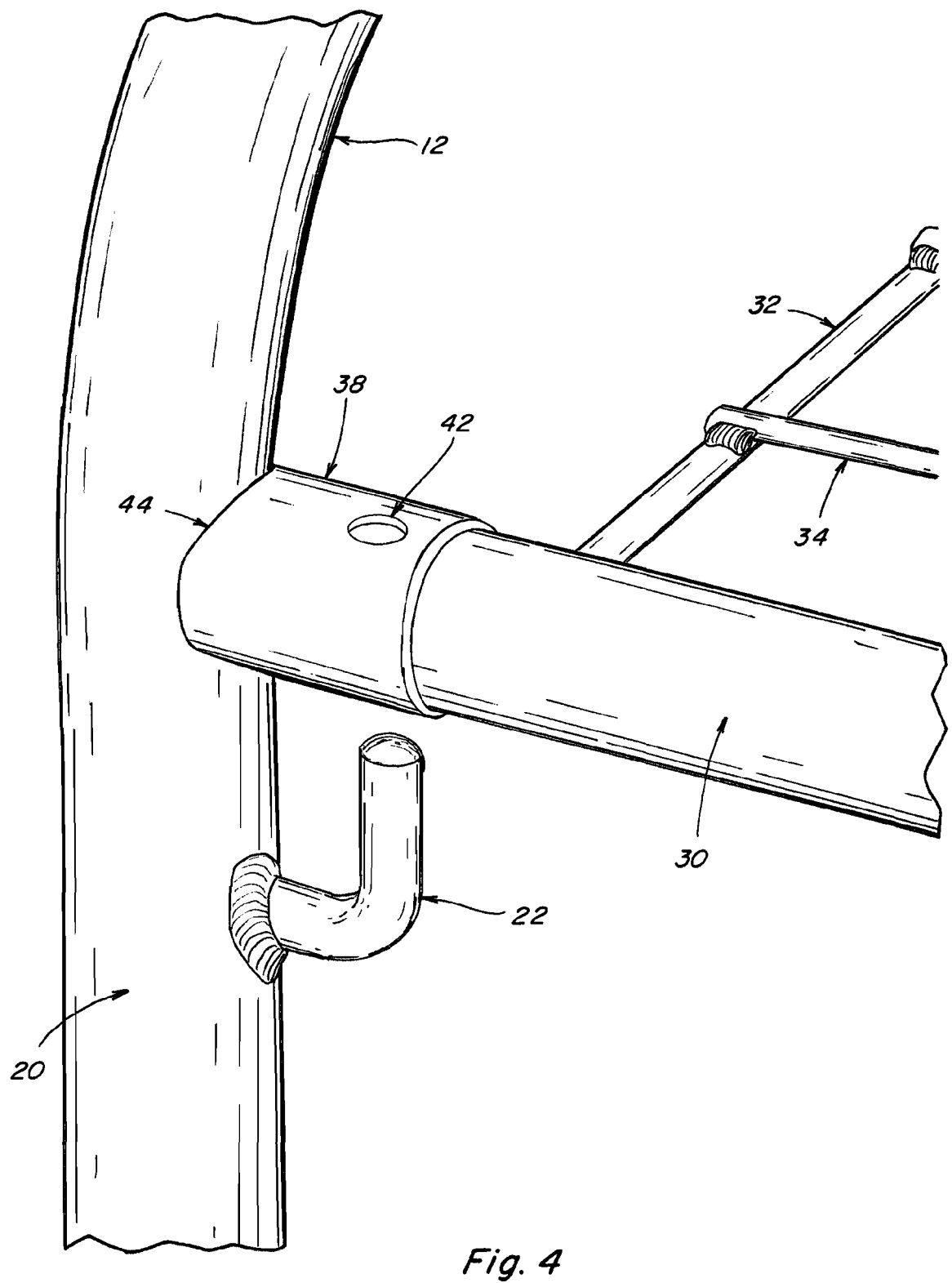
FIG. 4 is a perspective view of a plastic connector piece in an unattached state.
Figure 5:
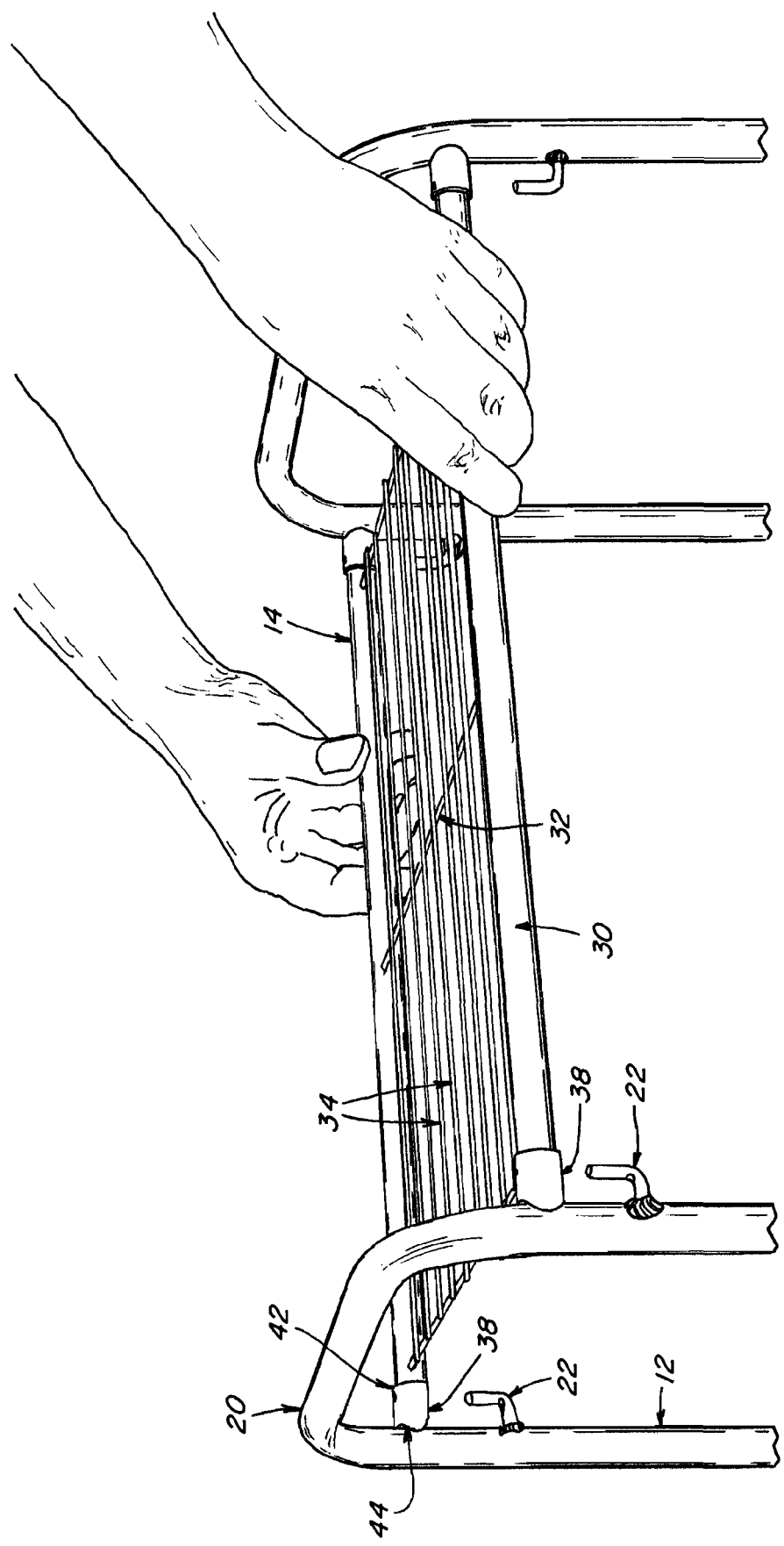
FIG. 5 is a perspective view of a top shelf in an unattached state.

FIG. 1 illustrates an embodiment of a shelving system in the form of a cart 10 with three shelves according to the present invention. This embodiment comprises two side frames 12, a top shelf 14, a middle shelf 16, and a bottom shelf 18.

Each side frame 12 comprises an inverted u-shaped portion 20, a plurality of prongs 22, a horizontal stabilizing bar 24, and two wheel portions 26. The inverted u-shaped portion 20 may be tubular to reduce both the weight and cost of the cart 10, while still maintaining sufficient strength for its intended uses. As described in more detail below, the prongs 22 extend upwardly and are used to attach the top shelf 14, middle shelf 16, and bottom shelf 18 to the side frames 12. The horizontal stabilizing bar 24 provides rigidity to the side frame 12 and, thus, to the cart 10 as a whole. Both the horizontal stabilizing bar 24 and the prongs 22 may be welded or otherwise connected to the tubular, inverted u-shaped portion 20. The wheel portions 26 provide mobility to the cart 10, allowing an end user to move the cart 10 with minimal effort. The wheel portions 26 may have two sets of bearings, allowing rotation in both the horizontal and vertical planes, and may include a breaking mechanism.

The middle shelf 16 and the bottom shelf 18 comprise two outer members 30 and a plurality of support members 32, wherein both the outer members 30 and the support members 32 are in the horizontal plane and the support members 32 are perpendicular to the outer members 30. The support members 32 may be welded or otherwise attached to the outer members 30. The support members 32 provide rigidity to the shelves, and thus to the cart 10 as a whole. The support members 32 also provide support for any drawers 50 that may be used, as discussed below.

In the depicted embodiment, the top shelf 14 comprises two outer members 30, a plurality of support members 32, and a plurality of intermediate members 34. As in the case of the middle shelf 16 and bottom shelf 18, the outer members 30 and support members 32 are in the horizontal plane and perpendicular to each other. The intermediate members 34 are parallel to and positioned between the outer members 30. In the depicted embodiment, the intermediate members 34 are spaced at even intervals and are closer together than the support members 32. In the depicted embodiment the intermediate members 34 add utility to the cart 10 by providing a useful top shelf 14 on which items may be placed. The intermediate members 34 may be welded or otherwise attached to the support members 32.

In the depicted embodiment, each outer member 30 comprises a tubular steel portion 36 and two connector portions 38. The tubular steel portion 36 may be attached to the connector portions 38 by glue, welding or other means, or held in place by friction or mechanical snaps incorporated onto the connector portions 38 and/or tubular steel portion 36.

In the embodiments depicted in FIGS. 2-5, each connector portion 38 contains a hole 42 passing, at least partially, vertically through the connector portion 38. Each hole 42 is sized to receive a prong 22, and each prong 22 is attached to the inverted u-shaped portion 20 in a position such that the top shelf 14, middle shelf 16 and bottom shelf 18 will be desirably placed. In an alternative embodiment, multiple sets of prongs 22 may be attached to the inverted u-shaped portion 20 so as to provide an end user with multiple options for shelf configuration. The connector portion 38 is further comprised of a curved distal end 44 such that it fits flush with the u-shaped portion 20. Thus, when all four connector portions 38 of a given shelf are in an attached position, i.e. when the prongs 22 are inserted in the holes 42, the shelf is prevented from horizontal rotation or translation independent of the side frames 12 and is further prevented from vertical movement in the downward direction independent of the side frames 12.

Figure 6:
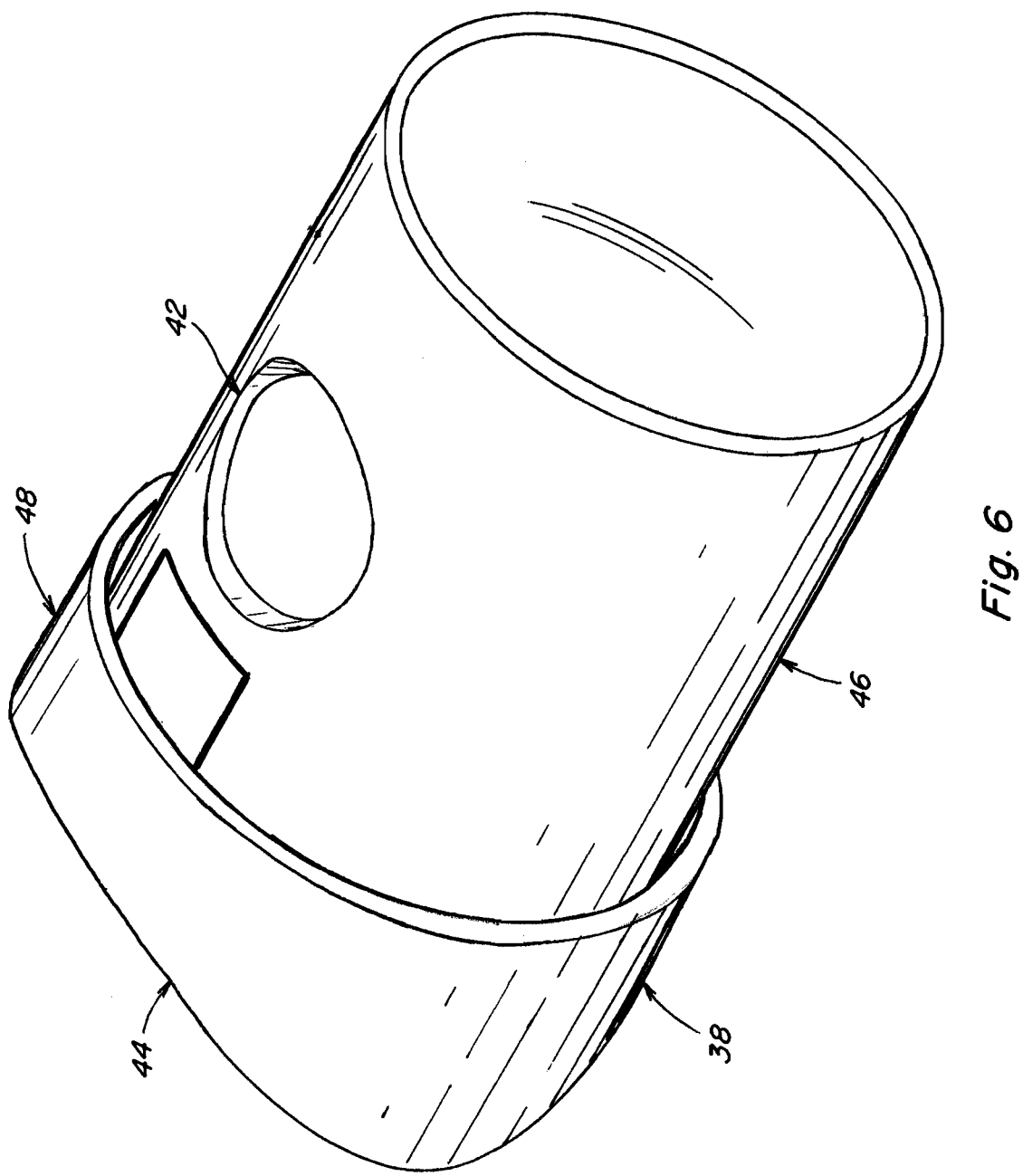
FIG. 6 is a perspective view of an alternate embodiment of the connector portion.
Figure 7:
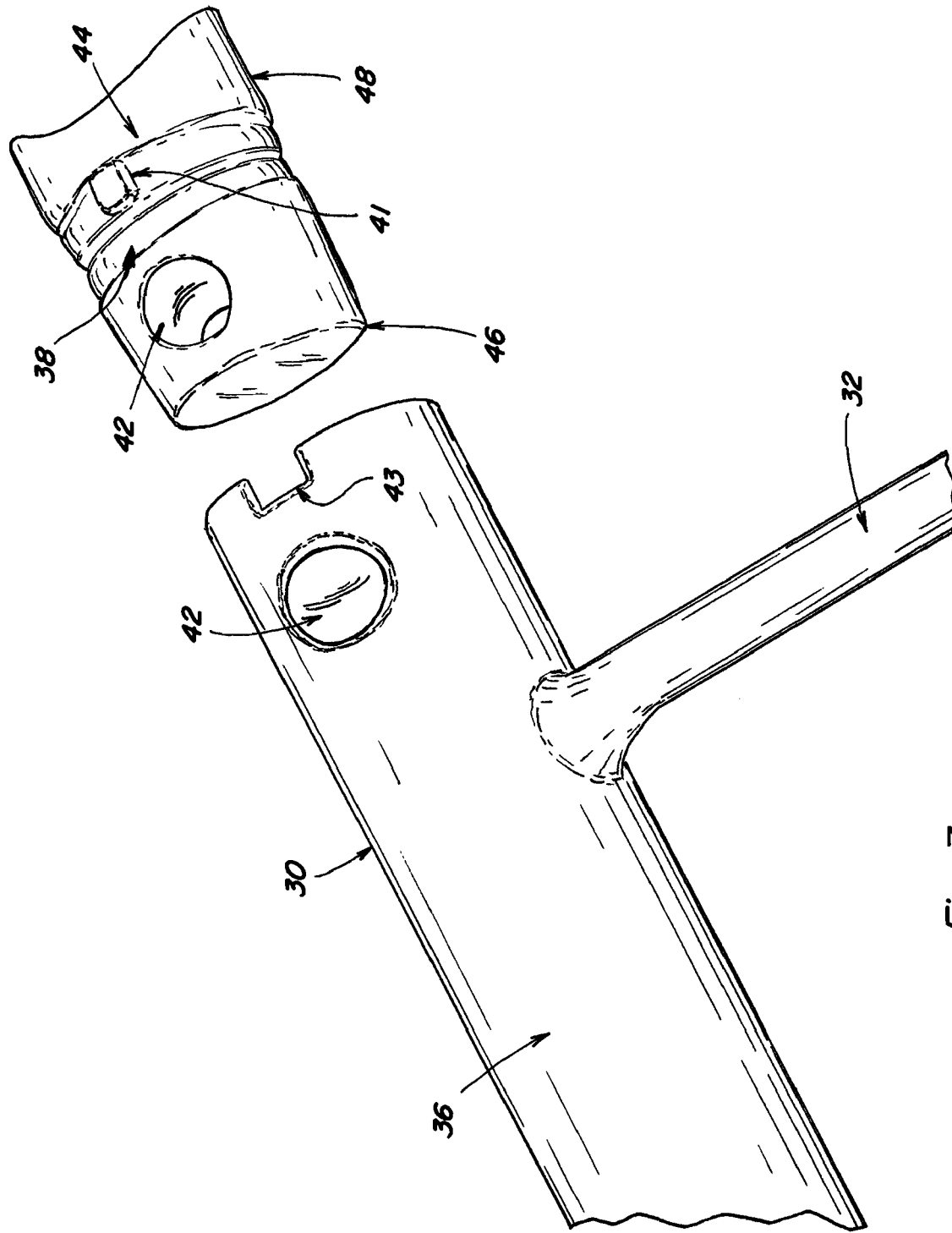
FIG. 7 is a perspective view of an alternate embodiment of a tubular steel portion and a connector portion in an unattached state.
Figure 8:
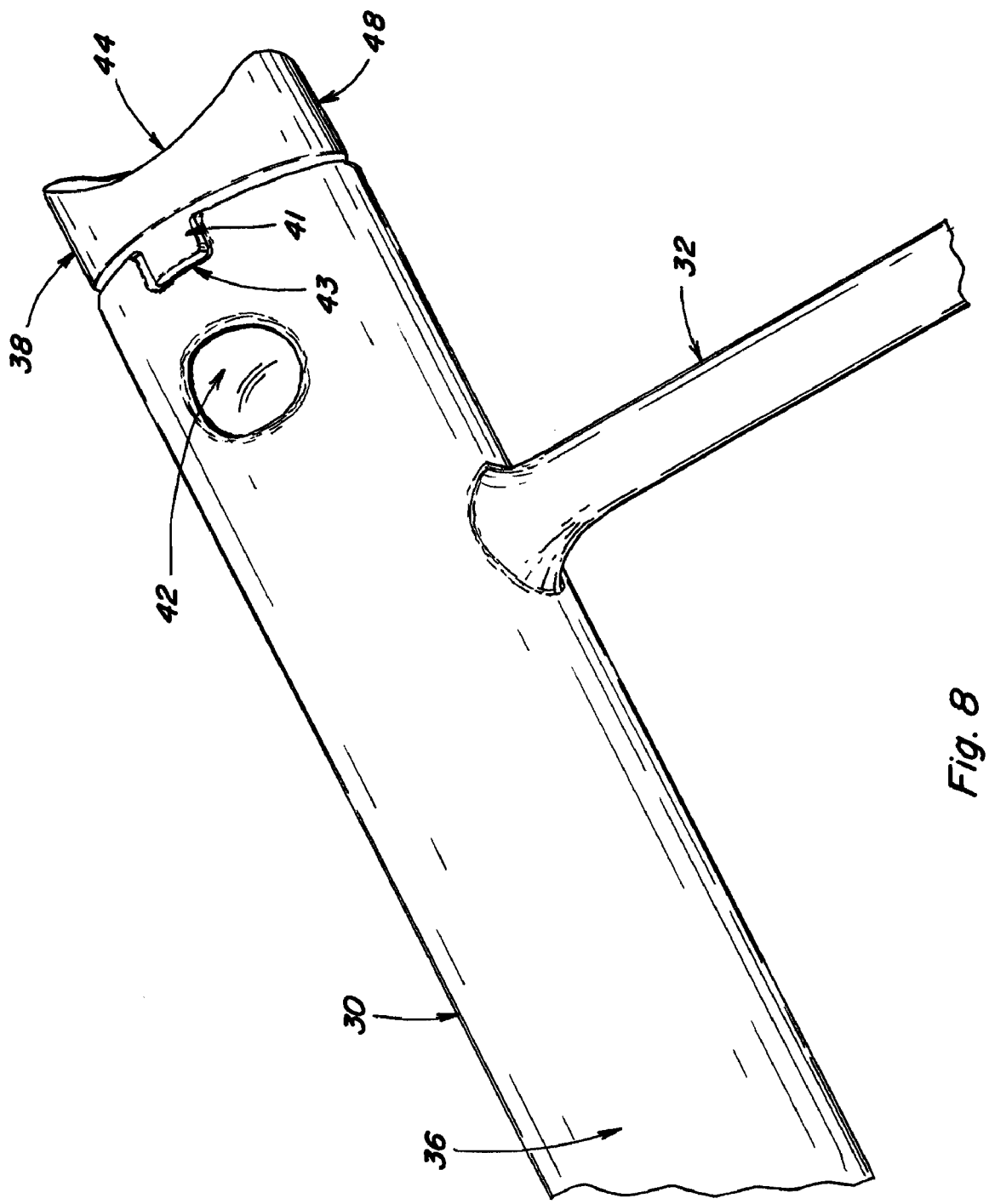
FIG. 8 is a perspective view of an alternate embodiment of a tubular steel portion and a connector portion in an attached state.

FIGS. 6-8 depict an alternative embodiment of the present invention in which the connector portion 38 is configured to be inserted into the tubular steel portion 36 of the outer member 30. In this embodiment, the connector portion 38 is comprised of an insertion portion 46 and an external portion 48 and is configured such that the hole 42 passes through the insertion portion 46. According to this embodiment, the hole 42 passes through the downwardly facing surface of both the connector portion 38 and the tubular steel portion 36 of the outer member 30. The hole 42 does not pass through the upwardly facing surface of the tubular steel portion 36, thereby preserving an uninterrupted aesthetic appearance on the upwardly facing surface of the tubular steel portion 36. Thus, when a shelf is attached to a side frame 12, the prong 22 passes through the downwardly facing surface of both the tubular steel portion 36 and the connector portion 38.

Furthermore, according to this embodiment of the present invention, the connector portion 38 further comprises a protrusion 41, and the tubular steel portion 36 further comprises a recess 43 for receiving the protrusion 41. Thus, when the outer member 30 is assembled, the protrusion 41 is situated inside the recess 43 and prevents the connector portion 38 from rotating independently of the tubular steel portion 36.

Figure 9:
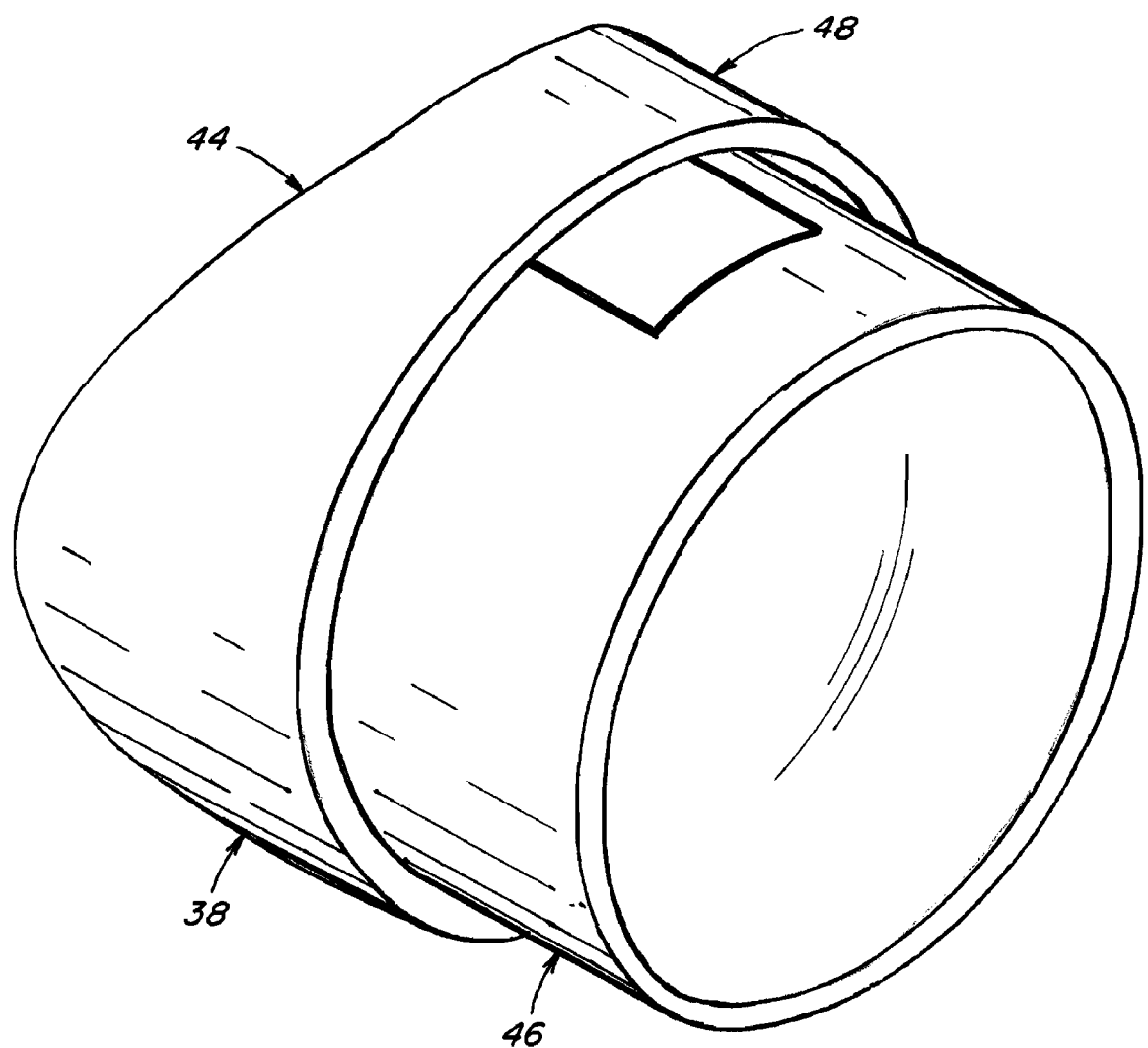
FIG. 9 is a perspective view of another alternate embodiment of the connector portion.

FIG. 9 depicts yet another alternative embodiment of the connector portion 38 in which the internal portion 46 of the connector portion 38 is cut off before the region of the tubular steel portion 36 that the hole 42 passes through. Thus, in this embodiment, when a shelf is attached to a side frame 12, the prong 22 passes through the tubular steel portion 36 and does not pass through the connector portion 38.

Figure 10:
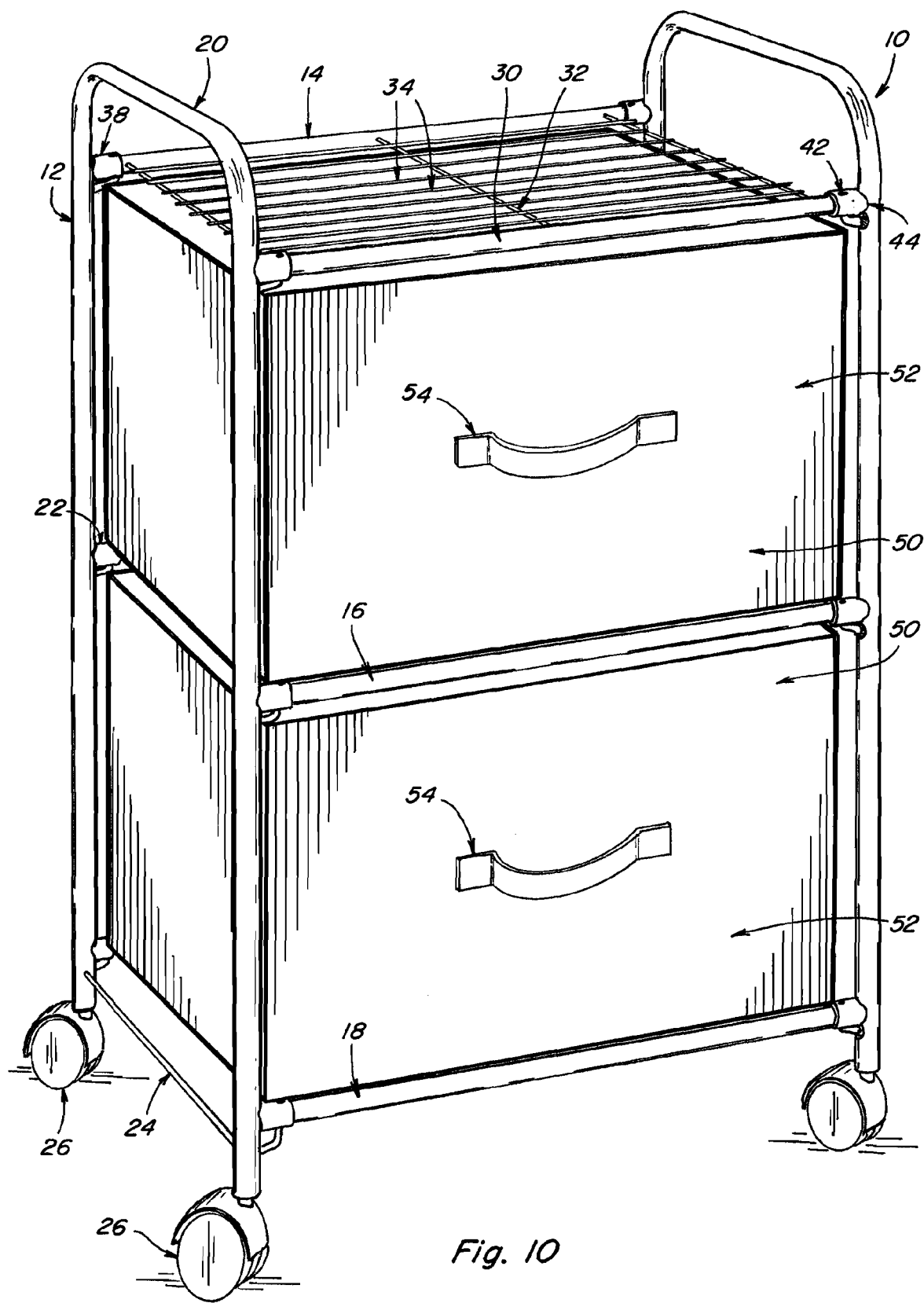
FIG. 10 is a perspective view of a shelving system with two drawers attached according to an embodiment of the present invention.

In the embodiment depicted in FIG. 10 drawers 50 are inserted to rest on the middle shelf 16 and the bottom shelf 18. In the depicted embodiment, these drawers 50 comprise a five sided body 52, having an open top, and a handle 54. However, persons having skill in the art will recognize that numerous configurations are possible for the drawers 50 without departing from the scope of the invention. For example, the drawers 50 could include lids to cover the top, or the frontward facing surface of the drawers 50 could open to provide access to the contents of the drawer from the front by providing hinges on the bottom of the front surface.

In the depicted embodiments, the cart 10, with the exception of the drawers 50, the wheel portions 26, and the connector portions 38, is substantially made of steel. In the depicted embodiment, the drawers 50 could be made of a variety of materials such as plastic, fabric, cardboard, metal, wood or any other material known in the art for fabricating drawers. In the depicted embodiment the connector portions 38 are made of plastic, and the construction of the wheel portions 26 comprise a combination of plastics and metals as is well known in the art. However, persons skilled in the art will recognize that the various components of the present invention could be made of numerous and varied materials other than those disclosed in the embodiments depicted herein and that the use of such other materials for the construction of such various components are within the scope of the present invention.

Various embodiments of the invention have been described above to explain the principles of the invention and its practical application to thereby enable others skilled in the art to utilize the invention. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described embodiments, but should be defined only in accordance with the following claims appended hereto and their equivalents.

What is claimed is:

1. A shelving system comprising:
   first and second side frames, each of said side frames having at least one upwardly extending prong;
   a shelf frame having at least two connector sections;
   each of said connector sections:
      being in communication with one of said side frames;
      defining a vertical hole therein to receive one of said upwardly extending prongs;
      comprising a distal end; and
      further comprising a connector insert forming a removable and replaceable portion of said connector section and wherein said connector insert at least partially engages said distal end;
   wherein at least said connector section of said shelf frame comprises a cylindrical cross-section having an inside diameter and an outside diameter;
   said connector insert comprising a first portion having a circular cross-section and an outside diameter smaller than said inside diameter of said connector section, thereby allowing said first portion of said connector insert to be inserted into said connector section; and
   said connector insert comprising a second portion having a cylindrical cross-section and an outside diameter generally equivalent to said outside diameter of said connector section.

2. The shelving system as set forth in claim 1, wherein said second portion of said connector insert has a distal end that is contoured so as to be substantially flush with said side frame when said upwardly extending prong is inserted into said vertical hole.

3. The shelving system as set forth in claim 1, further comprising a tab located on one of said second portion of said connector insert and said shelf frame; and
   a recess adapted to mate with said tab located on the other of said second portion of said connector insert and said shelf frame.

4. A shelf, comprising
   first and second side frames, each of said side frames having at least one upwardly extending prong;

a shelf frame having at least two connector sections, wherein each of said connector sections is in communication with one of said side frames and comprises a cylindrical cross-section having an inside diameter and an outside diameter;

said connector section comprising a connector insert further comprising a first portion having a cylindrical cross-section and an outside diameter smaller than said inside diameter of said connector section, thereby allowing said first portion of said connector insert to be inserted into said connector section; and said connector insert comprising a second portion having a circular cross-section and an outside diameter generally equivalent to said outside diameter of said connector section; and wherein each connector section defines a vertical hole therein to receive one of said upwardly extending prongs.

5. The shelving system as set forth in claim 4, wherein said second portion of said connector insert has a distal end that is contoured so as to be substantially flush with said side frame when said upwardly extending prong is inserted into said vertical hole.

6. The shelving system as set forth in claim 4, further comprising a tab located on one of said second portion of said connector insert and said shelf frame; and a recess adapted to mate with said tab located on the other of said second portion of said connector insert and said shelf frame.

* * * * *